United States Patent
Casper et al.

(10) Patent No.: US 9,095,090 B2
(45) Date of Patent: Aug. 4, 2015

(54) PRESSURE-BASED CONTROL SYSTEM FOR AN AGRICULTURAL IMPLEMENT

(75) Inventors: Robert T. Casper, Mingo, IA (US); John M. Schweitzer, Ankeny, IA (US); Ricky B. Theilen, Altoona, IA (US)

(73) Assignee: DEERE & COMPANY, Moline, IL (US)

( * ) Notice: Subject to any disclaimer, the term of this patent is extended or adjusted under 35 U.S.C. 154(b) by 48 days.

(21) Appl. No.: 13/600,515

(22) Filed: Aug. 31, 2012

(65) Prior Publication Data

US 2014/0067209 A1 Mar. 6, 2014

(51) Int. Cl.
G06F 17/00 (2006.01)
A01B 79/00 (2006.01)
G09B 29/10 (2006.01)

(52) U.S. Cl.
CPC .......... *A01B 79/005* (2013.01); *G09B 29/106* (2013.01)

(58) Field of Classification Search
CPC .... A01B 79/005; A01B 69/008; A01C 33/00; A01B 13/16; A01C 5/06; A01C 5/062; G09B 29/106
USPC ......... 701/50, 55, 60, 65, 400, 408, 468, 469; 172/49, 255, 260.5; 111/14, 149
See application file for complete search history.

(56) References Cited

U.S. PATENT DOCUMENTS

| | | | |
|---|---|---|---|
| 4,600,060 A | 7/1986 | Winter et al. | |
| 5,902,343 A | 5/1999 | Hale et al. | |
| 5,961,573 A | 10/1999 | Hale et al. | |
| 6,041,582 A | 3/2000 | Tiede et al. | |
| 6,070,673 A | 6/2000 | Wendte | |
| 7,479,922 B2 | 1/2009 | Hunt et al. | |
| 2010/0161183 A1* | 6/2010 | Beese | 701/50 |
| 2011/0036281 A1* | 2/2011 | Beaujot | 111/149 |
| 2012/0000681 A1* | 1/2012 | Douglas | 172/1 |
| 2012/0078487 A1* | 3/2012 | Light-Holets | 701/102 |
| 2012/0125244 A1 | 5/2012 | Beaujot | |

OTHER PUBLICATIONS

European Search Report, dated Oct. 31, 2013 (5 pages).

* cited by examiner

*Primary Examiner* — Mary Cheung

(57) ABSTRACT

A control system for an agricultural implement is disclosed. The agricultural implement includes a ground-engaging tool and an adjustment device. The adjustment device is coupled to the ground-engaging tool. The control system includes a location-determining receiver. The location-determining receiver is configured for receiving positioning signals. A correction receiver is in communication with the location-determining receiver and configured for receiving correction signals and determining a corrected geographic location of the ground-engaging tool. A data storage device is configured for storing operating pressure data referenced to geographic location data of the ground-engaging tool. An electronic data processor is in communication with the correction receiver and the data storage device and configured for receiving the corrected geographic location, correlating the corrected geographic location with the operating pressure data, and controlling the adjustment device to provide operating pressure to the ground-engaging tool.

20 Claims, 3 Drawing Sheets

| Data Reference Number | Latitude | Longitude | Altitude (Feet above sea level) | Speed (MPH) | Ground Engaging Tool-1 Pressure (PSI) | Ground Engaging Tool-2 Pressure (PSI) |
|---|---|---|---|---|---|---|
| ... | ... | ... | ... | ... | ... | ... |
| 175 | N41° 28.6071' | W090° 25.4891' | 665 | 12.0 | 1200.0 | 1001.0 |
| 176 | N41° 28.4258' | W090° 25.5355' | 664 | 11.9 | 1199.0 | 1002.0 |
| ... | ... | ... | ... | ... | ... | ... |

PRESSURE-BASED CONTROL SYSTEM FOR AN AGRICULTURAL IMPLEMENT

FIELD OF THE DISCLOSURE

The present disclosure generally relates to agricultural implements and more particularly to a pressure-based control system for an agricultural implement.

BACKGROUND OF THE DISCLOSURE

In order to provide control for agricultural implements, a position or height-based electro-hydraulic control system is commonly used. For example, John Deere's AccuDepth™ provides depth control across the width of the implement by sensing a combination of relative height and angle.

SUMMARY OF THE DISCLOSURE

In one embodiment, a control system for an agricultural implement is disclosed. The agricultural implement includes a ground-engaging tool and an adjustment device. The adjustment device is coupled to the ground-engaging tool. The control system includes a location-determining receiver. The location-determining receiver is configured for receiving positioning signals. A correction receiver is in communication with the location-determining receiver and configured for receiving correction signals and determining a corrected geographic location of the ground-engaging tool. A data storage device is configured for storing operating pressure data referenced to geographic location data of the ground-engaging tool. An electronic data processor is in communication with the correction receiver and the data storage device and configured for receiving the corrected geographic location, correlating the corrected geographic location with the operating pressure data, and controlling the adjustment device to provide operating pressure to the ground-engaging tool.

In another embodiment, an agricultural implement is disclosed. The agricultural implement is adapted to be moved by a vehicle in a forward direction of travel. The agricultural implement includes a ground-engaging tool. An adjustment device is coupled to the ground-engaging tool. The agricultural implement includes a control system. The control system includes a location-determining receiver. The location-determining receiver is configured for receiving positioning signals. A correction receiver is in communication with the location-determining receiver and configured for receiving correction signals and determining a corrected geographic location of the ground-engaging tool. A data storage device is configured for storing operating pressure data referenced to geographic location data of the ground-engaging tool. An electronic data processor is in communication with the correction receiver and the data storage device and configured for receiving the corrected geographic location, correlating the corrected geographic location with the operating pressure data, and controlling the adjustment device to provide operating pressure to the ground-engaging tool.

In yet another embodiment, a method for controlling an agricultural implement is disclosed. The agricultural implement includes a ground-engaging tool and an adjustment device. The method includes receiving positioning signals. The method includes receiving correction signals. The method includes determining a corrected geographic location of the ground-engaging tool. The method includes storing operating pressure data referenced to geographic location data of the ground-engaging tool. The method includes correlating the corrected geographic location with the operating pressure data. The method includes controlling the adjustment device to provide operating pressure to the ground-engaging tool.

Other features and aspects will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments of the invention may include any combination of features from one or more dependent claims, and such features may be incorporated, collectively or separately, into any independent claim.

DETAILED DESCRIPTION

Figure 1:
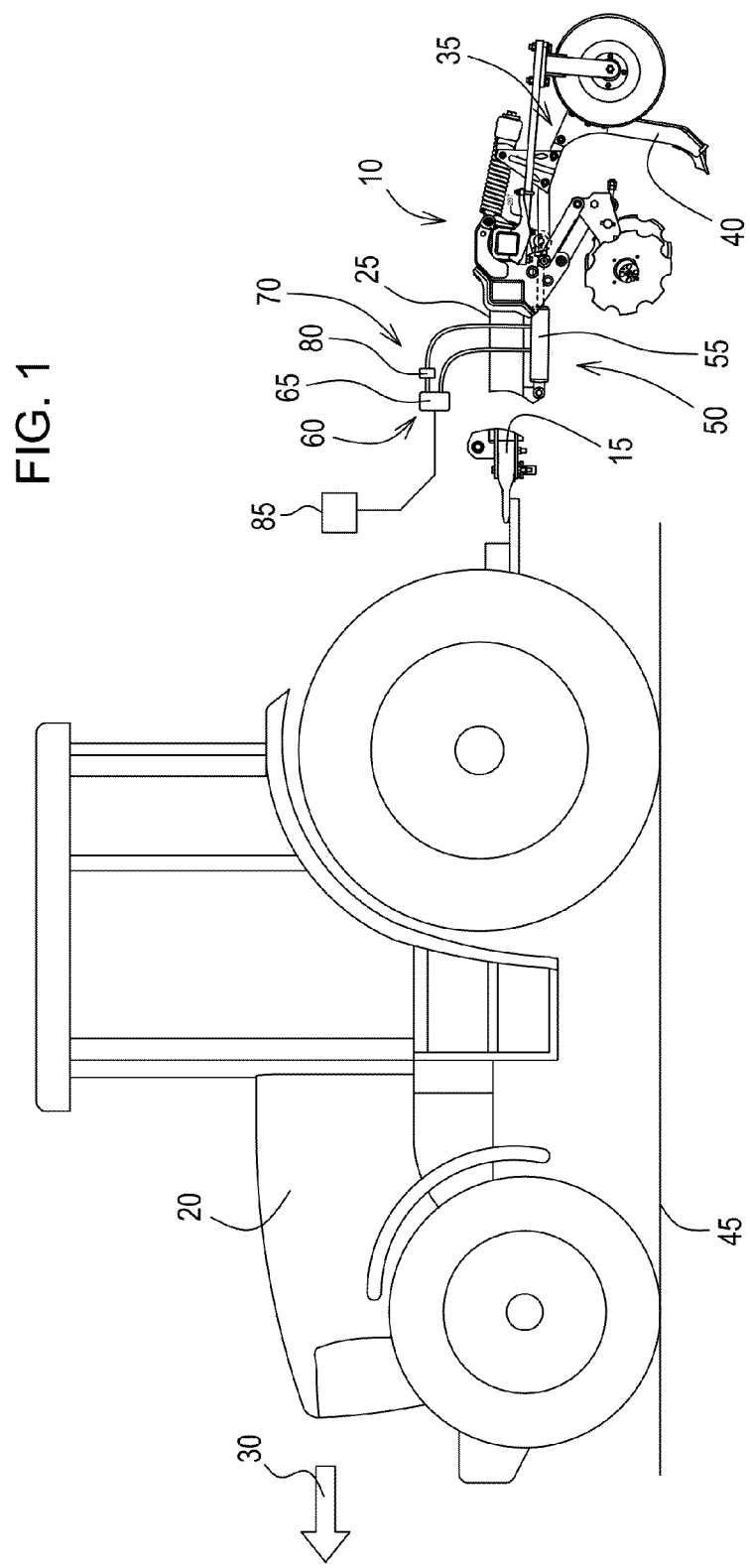
FIG. 1 is a fragmentary side view of an agricultural implement according to one embodiment.

FIG. 1 illustrates an agricultural implement 10 according to one embodiment. The illustrated agricultural implement 10 includes a coupling mechanism 15 for coupling to a vehicle 20.

A frame 25 is coupled to the coupling mechanism 15. The frame 25 extends rearwardly from the coupling mechanism 15 in a direction opposite of a direction of travel 30. A ground-engaging tool 35 is coupled to the frame 25. Additional ground-engaging tools 35 may be coupled to the frame 25. The illustrated ground-engaging tool 35 is a ripper 40. Other ground-engaging tools 35 (e.g., disks, openers) are contemplated by this disclosure. A plurality of wheel assemblies (not shown) are coupled to the frame 25 to support the frame 25 above ground 45.

An adjustment device 50 is coupled to the ground-engaging tool 35. The illustrated adjustment device 50 is an extendable and retractable hydraulic cylinder 55. Alternatively, the adjustment device 50 may be an electric actuator, pneumatic cylinder, or other similar device. Additional adjustment devices 50 may be coupled to additional ground-engaging tools 35 for individual control thereof.

A controller 60 is in communication with the adjustment device 50. The illustrated controller 60 is an electro-hydraulic valve 65 that is in fluid communication with the adjustment device 50. The electro-hydraulic valve 65 is configured to receive a source of a pressurized hydraulic fluid. Alternatively, an electronic controller or other similar device may be used.

A pressure sensing device 70 is positioned to measure an indication of an actual operating pressure 75 (FIG. 2) of the ground-engaging tool 35. The illustrated pressure sensing device 70 is a pressure transducer 80 that is in fluid communication with the adjustment device 50. Alternatively, a load cell or other pressure sensor may be used.

A control system 85 is in communication with the adjustment device 50 via the controller 60. The control system 85 communicates with the controller 60 via a logical data path, a physical data path, a databus, or other communication pathway.

Figure 2:
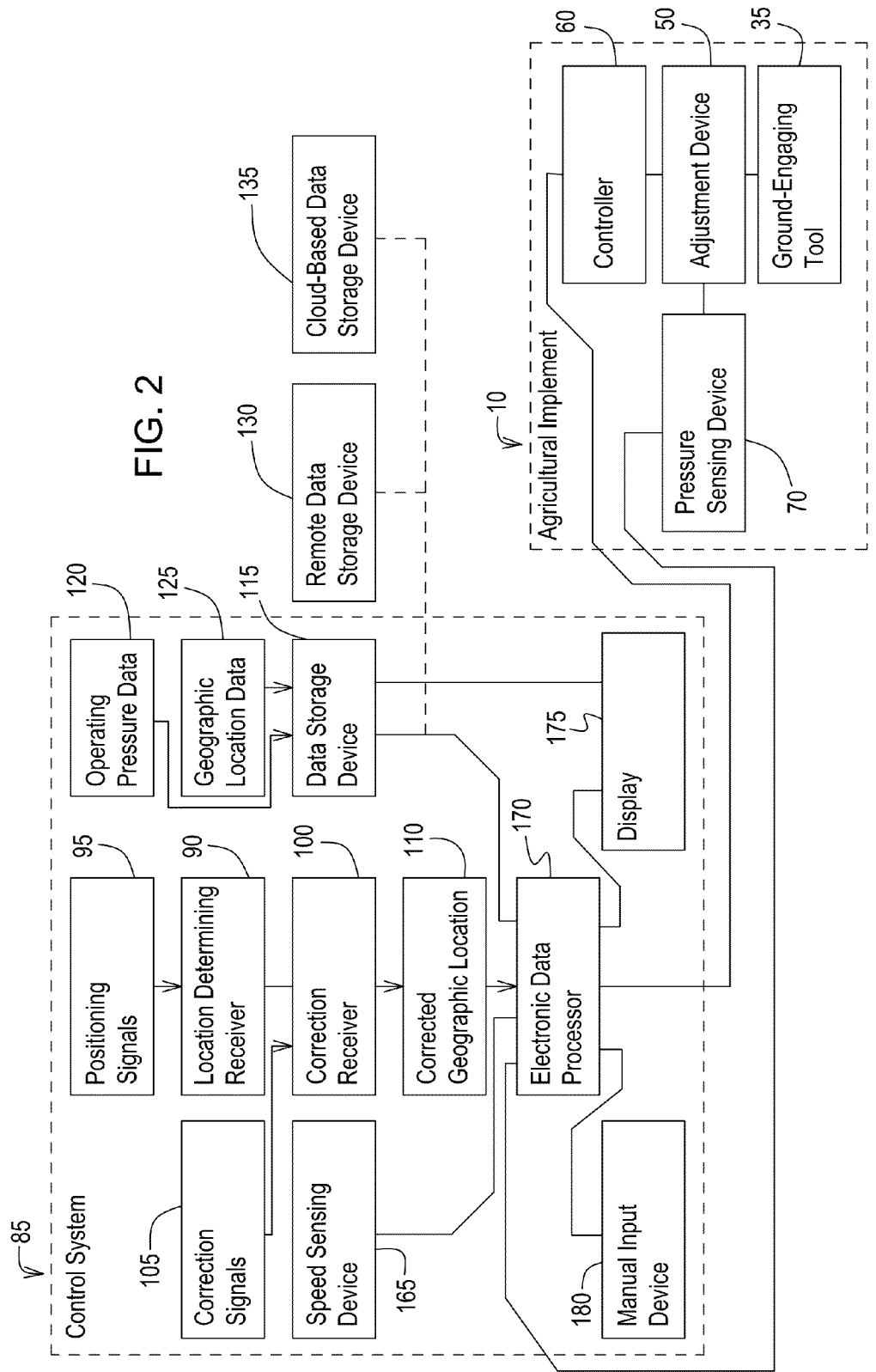
FIG. 2 is a schematic of the agricultural implement of FIG. 1.

With reference to FIG. 2, the control system 85 includes a location-determining receiver 90. The location-determining receiver 90 is configured for receiving positioning signals 95. The location-determining receiver 90 may be a Global Positioning System (GPS) receiver, a radio frequency ranging system, a microwave ranging system, a local positioning system, a laser pointing system, or an optical positioning system as described in commonly assigned U.S. Pat. No. 7,479,922, which is hereby incorporated by reference. The laser pointing system and the optical positioning system may operate in at least one of a visible light spectrum, an infrared spectrum, a near-infrared spectrum, and an ultra-violet light spectrum as described in U.S. Pat. No. 7,479,922.

A correction receiver 100 is in communication with the location-determining receiver 90. The correction receiver 100 is configured for receiving correction signals 105 and determining a corrected geographic location 110 of the ground-engaging tool 35.

Figures 3, 4:
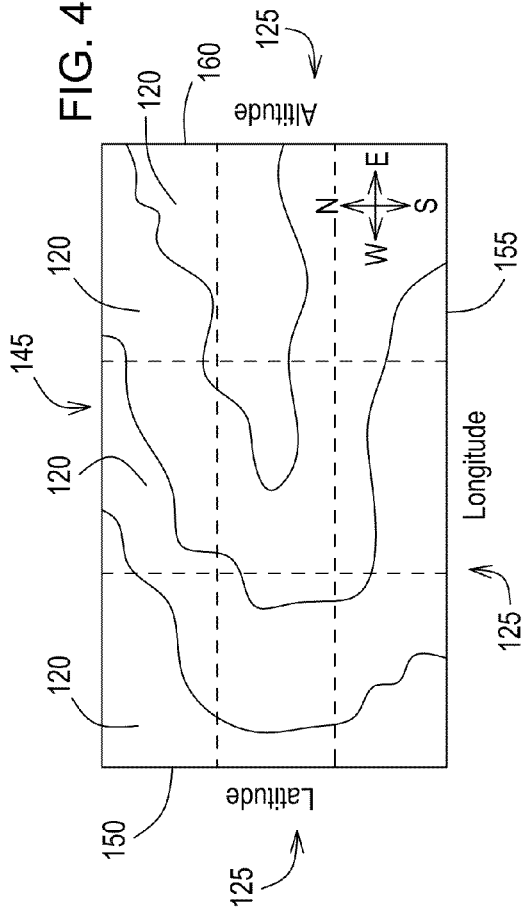
FIG. 3 is a chart representing data of a data storage device of the agricultural implement of FIG. 1.
FIG. 4 is a map representing data of a data storage device of the agricultural implement of FIG. 1.

The control system 85 includes a data storage device 115 configured for storing operating pressure data 120 referenced to geographic location data 125 of the ground-engaging tool 35. The data storage device 115 may be a remote data storage device 130 or a cloud-based data storage device 135. The data storage device 115 may store the operating pressure data 120 and the geographic location data 125 as a look-up table 140 (FIG. 3), a prescription map 145 (FIG. 4), or other format. The operating pressure data 120 may include operating pressure for a plurality of ground-engaging tools 35. With reference to FIG. 3, the geographic location data 125 may include latitude 150, longitude 155, altitude 160, and other data.

Referring to FIG. 2, a speed sensing device 165 may be positioned to measure an indication of a speed of at least one of the agricultural implement 10 and the vehicle 20. The speed sensing device 165 may be an existing speed sensing device on the vehicle 20 (e.g., radar device, speed sensor).

An electronic data processor 170 is in wired or wireless communication with the correction receiver 100, the data storage device 115, and the controller 60. The electronic data processor 170 may communicate with the speed sensing device 165 to determine a distance traveled. The electronic data processor 170 is configured to receive a source of electrical power. The electronic data processor 170 may provide open loop control of the ground-engaging tool 35. Alternatively, the electronic data processor 170 may provide closed loop control of the ground-engaging tool 35 using feedback from the pressure sensing device 70. The electronic data processor 170 may utilize a proportional-integral-derivative (PID) control loop logic.

A display 175 may be in wired or wireless communication with at least one of the data storage device 115 and the electronic data processor 170. The display 175 may be used to visually depict the look-up table 140 (FIG. 3) or the prescription map 145 (FIG. 4). The display 175 may also visually depict data in real time such as the operating pressure data 120, geographic location data 125, speed, or distance traveled.

A manual input device 180 (e.g., keyboard, touch screen, voice recognition, switch, graphical user interface) may be in wired or wireless communication with the electronic data processor 170. The manual input device 180 may be used to change operating pressure data 120 or to manually create the look-up table 140 (FIG. 3) or prescription map 145 (FIG. 4).

In operation, the agricultural implement 10 is adapted to be pulled by the vehicle 20. As the agricultural implement 10 moves across the ground 45, the location-determining receiver 90 receives the positioning signals 95. The correction receiver 100 communicates with the location-determining receiver 90 and receives correction signals 105. Using logic, the correction receiver 100 determines the corrected geographic location 110 of the ground-engaging tool 35 from the positioning signals 95 and the correction signals 105.

The electronic data processor 170 receives the corrected geographic location 110, looks up the corrected geographic location 110 in the look-up table 140 of the data storage device 115, reads the corresponding operating pressure data 120, and communicates the operating pressure data 120 to the electro-hydraulic valve 65 as a pressure set point. The electro-hydraulic valve 65 sets the hydraulic fluid flow to the ground-engaging tool 35 to achieve the pressure set point. The pressure transducer 80 communicates the actual operating pressure 75 to the electronic data processor 170. The electronic data processor 170 may control the electro-hydraulic valve 65 using open loop control. Alternatively, the electronic data processor 170 may control the electro-hydraulic valve 65 using closed loop control by using the actual operating pressure 75 feedback from the pressure transducer 80 and PID control loop logic.

Various features are set forth in the following claims.

What is claimed is:

1. A control system for an agricultural implement, the agricultural implement comprising a ground-engaging tool and an adjustment device coupled to the ground-engaging tool, the control system comprising:
a location-determining receiver configured for receiving positioning signals;
a correction receiver in communication with the location-determining receiver and configured for receiving correction signals and determining a corrected geographic location based on a distance traveled by the ground-engaging tool;
a data storage device configured for storing operating pressure data referenced to geographic location data of the ground-engaging tool; and
an electronic data processor in communication with the correction receiver and the data storage device and configured for receiving the corrected geographic location, correlating the corrected geographic location with the operating pressure data stored in a look-up table in the data storage device, and controlling the adjustment device to provide operating pressure to the ground-engaging tool, wherein the data storage device is at least one of a remote data storage device and a cloud-based data storage device.

2. The control system of claim 1, further comprising a pressure sensing device configured for measuring an indication of an actual operating pressure and communicating the actual operating pressure to the electronic data processor, which is configured to control the adjustment device based on at least one of the actual operating pressure and the operating pressure data.

3. The control system of claim 2, wherein the electronic data processor utilizes a PID control loop.

4. The control system of claim 2, wherein the pressure sensing device is at least one of a pressure transducer and a load cell.

5. The control system of claim 1, wherein the location-determining receiver is at least one of a GPS receiver, a radio frequency ranging system, a microwave ranging system, and a local positioning system.

6. The control system of claim 1, wherein the location-determining receiver is at least one of a laser pointing system and an optical positioning system operated in at least one of a visible light spectrum, infrared spectrum, near-infrared spectrum, and ultra-violet light spectrum.

7. The control system of claim 1, further comprising a display configured to visually depict at least one of the operating pressure data and the geographic location data.

8. The control system of claim 1, wherein the electronic data processor provides open loop control of the ground-engaging tool.

9. The control system of claim 1, wherein the lookup table includes a prescription map.

10. An agricultural implement adapted to be moved by a vehicle in a forward direction of travel, the agricultural implement comprising:
    a ground-engaging tool;
    an adjustment device coupled to the ground-engaging tool; and
    a control system comprising a location-determining receiver configured for receiving positioning signals, a correction receiver in communication with the location-determining receiver and configured for receiving correction signals and determining a corrected geographic location of the ground-engaging tool, a data storage device having stored operating pressure data referenced to geographic location data of the ground-engaging tool, and an electronic data processor having at least two alternative modes:
    a first alternative, the electronic data processor in communication with the correction receiver and the data storage device and configured for receiving the corrected geographic location, correlating the corrected geographic location with the stored operating pressure data, and controlling the adjustment device to provide stored operating pressure to the ground-engaging tool; and
    a second alternative, the electronic data processor controlling the adjustment device using an actual operating pressure, wherein the electronic data processor utilizes a closed control loop.

11. The agricultural implement of claim 10, further comprising a pressure sensing device configured for measuring an indication of the actual operating pressure and communicating the actual operating pressure to the electronic data processor, which is configured to control the adjustment device based on at least one of the actual operating pressure and the operating pressure data.

12. The agricultural implement of claim 11, wherein the pressure sensing device is at least one of a pressure transducer and a load cell.

13. The agricultural implement of claim 10, wherein the data storage device is at least one of a remote data storage device and a cloud-based data storage device.

14. The agricultural implement of claim 10, wherein the location-determining receiver is at least one of a GPS receiver, a radio frequency ranging system, a microwave ranging system, and a local positioning system.

15. The agricultural implement of claim 10, wherein the location-determining receiver is at least one of a laser pointing system and an optical positioning system operated in at least one of a visible light spectrum, infrared spectrum, near-infrared spectrum, and ultra-violet light spectrum.

16. The agricultural implement of claim 10, further comprising a display configured to visually depict at least one of the operating pressure data and the geographic location data.

17. The agricultural implement of claim 10, wherein the geographic location data includes latitude and longitude and altitude.

18. The agricultural implement of claim 10, wherein the closed loop control comprises a proportional integral derivative (PID) control loop logic.

19. A method for controlling an agricultural implement, the agricultural implement comprising a ground-engaging tool and an adjustment device coupled to the ground-engaging tool, the method comprising:
    receiving positioning signals;
    receiving correction signals;
    determining a corrected geographic location of the ground-engaging tool;
    looking up stored operating pressure data referenced to geographic location data of the ground-engaging tool;
    correlating the corrected geographic location with the stored operating pressure data; and
    wherein the controlling includes at least two alternative modes:
        using an open loop control the adjustment device to provide stored operating pressure to the ground-engaging tool; and
        using a closed loop control of the ground-engaging tool with feedback from the adjustment device, wherein the adjustment device senses actual operating pressure.

20. The method of claim 19, further comprising measuring an indication of the actual operating pressure, communicating the actual operating pressure to an electronic data processor, and controlling the adjustment device based on at least one of the actual operating pressure and the stored operating pressure data.

* * * * *